United States Patent
Ichikawa et al.

(10) Patent No.: US 7,560,661 B2
(45) Date of Patent: Jul. 14, 2009

(54) LASER BEAM MACHINE

(75) Inventors: Toshiyoshi Ichikawa, Anjo (JP); Wataru Iida, Ama-gun (JP); Kazuhisa Mikame, Nagoya (JP); Akio Satou, Toyota (JP); Hironari Mikata, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 476 days.

(21) Appl. No.: 10/574,695

(22) PCT Filed: Oct. 8, 2004

(86) PCT No.: PCT/JP2004/015301

§ 371 (c)(1), (2), (4) Date: Apr. 5, 2006

(87) PCT Pub. No.: WO2005/035178

PCT Pub. Date: Apr. 21, 2005

(65) Prior Publication Data

US 2007/0121682 A1    May 31, 2007

(30) Foreign Application Priority Data

Oct. 8, 2003    (JP)    ............... 2003-349001

(51) Int. Cl.
*B23K 26/08* (2006.01)
*B23K 26/06* (2006.01)

(52) U.S. Cl. ............... 219/121.82; 219/121.74; 219/121.78

(58) Field of Classification Search ............ 219/121.63, 219/121.82, 121.67, 121.74, 121.78, 121.79, 219/121.8; 359/201, 202, 203
See application file for complete search history.

(56) References Cited

U.S. PATENT DOCUMENTS 4,495,398 A * 1/1985 Bredow et al. ......... 219/121.67

(Continued)

FOREIGN PATENT DOCUMENTS

JP    55 114489 A    9/1980

(Continued)

OTHER PUBLICATIONS

English Translation of Written Opinion in the International Searching Authority for PCT/JP2004/015301 mailed Dec. 12, 2004.

(Continued)

*Primary Examiner*—Geoffrey S Evans
(74) *Attorney, Agent, or Firm*—Finnegan, Henderson, Farabow, Garrett & Dunner, LLP

(57) ABSTRACT

A laser beam machine for processing an article to be processed with a laser beam from a processing scanner 1 comprised of an optical system employing a laser oscillator 10. Article position controllers 2a and 2b are controlled in a coordinated manner in accordance with the direction of the laser beam from said processing scanner 1 such that the position of a surface to be processed of the article is controlled to be nearly perpendicular to the direction of the laser beam from the processing scanner 1. While an article to be processed mounted on one article position controller 2a is being processed and unloaded, another article to be processed can be loaded onto the other article position controller 2b. Thus, the wait time for the laser beam machine can be reduced and production efficiency can be improved.

3 Claims, 7 Drawing Sheets

U.S. PATENT DOCUMENTS

| | | | | | |
|---|---|---|---|---|---|
| 5,925,268 | A | * | 7/1999 | Britnell | 219/121.79 |
| 6,153,853 | A | * | 11/2000 | Maruyama et al. | 219/121.63 |
| 6,601,426 | B2 | * | 8/2003 | Wegener | 219/121.67 |
| 6,614,201 | B2 | * | 9/2003 | Saino et al. | 318/568.11 |
| 6,649,862 | B2 | * | 11/2003 | Verzeletti | 219/121.67 |
| 6,664,499 | B1 | * | 12/2003 | Brink et al. | 219/121.67 |
| 6,757,985 | B2 | * | 7/2004 | Hall | 33/503 |
| 7,159,633 | B2 | * | 1/2007 | Nemish | 157/18 |
| 2008/0259425 | A1 | * | 10/2008 | Boettcher | 359/201 |

FOREIGN PATENT DOCUMENTS

| | | | | |
|---|---|---|---|---|
| JP | 62-24880 | A | * | 2/1987 |
| JP | 06-246470 | | | 9/1994 |
| JP | 08 118061 | A | | 5/1996 |
| JP | 10-230393 | | | 9/1998 |
| JP | 10-230393 | A | * | 9/1998 |
| JP | 2001-232489 | | | 8/2001 |
| JP | 2002-224865 | A | * | 8/2002 |
| JP | 2003-305578 | | | 10/2003 |
| JP | 2003-305578 | A | * | 10/2003 |
| WO | WO-94-03302 | A1 | * | 2/1994 |

OTHER PUBLICATIONS

Copy of the Supplementary European Search Report for the corresponding European patent application No. 04773752.3.

* cited by examiner

LASER BEAM MACHINE

TECHNICAL FIELD

The present invention relates to a laser beam machine for processing an article with a laser beam of light from a processing scanner comprised of an optical system employing a laser oscillator. Particularly, the invention relates to a technology for efficiently joining and welding molded panels and the like.

BACKGROUND ART

JP Patent Publication (Kokai) No. 2001-232489 A discloses a laser beam machine equipped with a scanner unit for changing the direction of travel of a laser beam and a light-guiding unit for changing the position upon which the beam is focused. In this conventional technology, an article to be processed is irradiated with the laser beam at a processing spot where the beam is focused that is always on a flat surface, by controlling the scanner unit and the light-guiding unit in a coordinated manner.

In this conventional example, an article to be welded fixedly supported is processed, namely, welded, via a flat surface thereof using the laser beam machine.

DISCLOSURE OF THE INVENTION

In order to realize good welding by irradiating an article (such as a panel) to be processed with a laser beam, it is necessary to irradiate a surface to be processed of the article with a laser beam, ideally in a perpendicular or nearly perpendicular fashion.

For this reason, when processing a three-dimensional curved surface using the above-described conventional laser beam machine, the area that can be processed is limited and articles to be processed of intermediate or large sizes cannot be treated with one and the same scanner. In other words, in order to process all of an area to be processed, it has been necessary to change the direction of optical irradiation or the position of the article to be processed. This necessitated installing a plurality of scanners or dividing the operation into separate processing steps based on the introduction of a plurality of laser beam machines, resulting in increases in the size and cost of equipment. Additionally, both cases require time for the loading and unloading of the relevant article, resulting in a wait period for the laser beam machine and a decrease in production efficiency.

Thus, in a laser beam machine for processing an article with a laser beam from a processing scanner comprised of an optical system employing a laser oscillator, the inventors focused on the idea of controlling the position of the mounted article in a coordinated manner in accordance with the direction in which the laser beam travels from the processing scanner. After periods of research and development, the inventors arrived at the present invention by which the aforementioned problems associated with the conventional technology can be solved.

Specifically, the present invention includes a first to a fifth invention recited in claims 1 to 5.

The invention (a first invention) provides a laser beam machine for processing an article to be processed with a laser beam from a processing scanner comprised of an optical system employing a laser oscillator, said laser beam machine comprising two article position controllers for controlling the position of a mounted article in a coordinated manner in accordance with the direction of the laser beam from said processing scanner, wherein said article position controllers are disposed substantially symmetrically with respect to the center of the range of movement of a processing spot that is a focal point of the laser beam.

Thus, in accordance with the laser beam machine according to the first invention, because the position of the article to be processed can be controlled in a coordinated manner depending on the direction of the laser beam, limitations regarding the possible range of processing by the laser beam machine can be eliminated, allowing articles of intermediate and large sizes to be processed with one and the same scanner. Thus, the need to install a plurality of scanners or the need to change the position of the article to be processed depending on the processed location thereof can be eliminated. Further, the invention eliminates the need to introduce a plurality of laser beam machines and to divide the operation into a plurality of steps, whereby the problems associated with the increase in the size and cost of equipment can be eliminated.

Furthermore, because the laser beam machine according to the first invention is equipped with two article position controllers, an article to be processed mounted on one article position controller can be processed and unloaded while another article to be processed is loaded onto the other article position controller. Thus, the wait time for the laser beam machine can be reduced and production efficiency can be improved.

A laser beam machine according to the invention (a second invention) is based on the first invention, wherein the processing scanner further comprises a pivot shaft about which the processing spot moves.

Thus, the laser beam machine according to the second invention is based on the first invention, wherein the processing scanner comprises the pivot shaft, so that two articles mounted on the article position controllers can be processed by rotating the processing scanner.

In a laser beam machine according to the invention (a third invention), said two article position controllers are each comprised of a triaxial positioner having three rotational axes, of which first axes are inclined and disposed opposite to each other, wherein the position of a surface to be processed of said article to be processed is controlled to be nearly perpendicular to said laser beam.

Thus, the laser beam machine according to the third invention is based on the first invention, wherein the position of the surface of the article to be processed can be controlled to be nearly perpendicular to the laser beam. Thus, optimum processing of the surface of the article to be processed is enabled. Further, because the first axes of the triaxial positioners are disposed at an angle and opposite to each other, the installment, adjustment, removal and other work on the article to be processed are facilitated and, in addition, the laser beam from the rotating processing scanner can be more easily made to be perpendicular.

A laser beam machine according to the invention (a fourth invention) is based on the third invention, wherein said triaxial positioners are constructed such that the centers of rotation of said three axes are concentrated at a single point.

Thus, because the centers of rotation of the three axes of the triaxial positioner in the third invention are concentrated at a single point, conversion of coordinates for the calculation of the position of the article to be processed during coordinated control can be simplified, thereby facilitating coordinated control and increasing the reliability thereof.

A laser beam machine according to the invention (a fifth invention) is based on the fourth invention, wherein said processing scanner comprises a beam-scanning mechanism capable of controlling the focal position of said laser beam in X, Y, and Z directions using a focusing lens and a mirror that are movable.

Thus, because the focal position of the laser beam is controlled in the X, Y, and Z directions by the beam-scanning mechanism using the movable focusing lens and mirror in the laser beam machine of the fifth invention, the laser beam can be controlled to be nearly perpendicular to the surface of the article to be processed. As a result, optimum processing of the surface of the article to be processed can be realized.

BEST MODES FOR CARRYING OUT THE INVENTION

Figure 1:
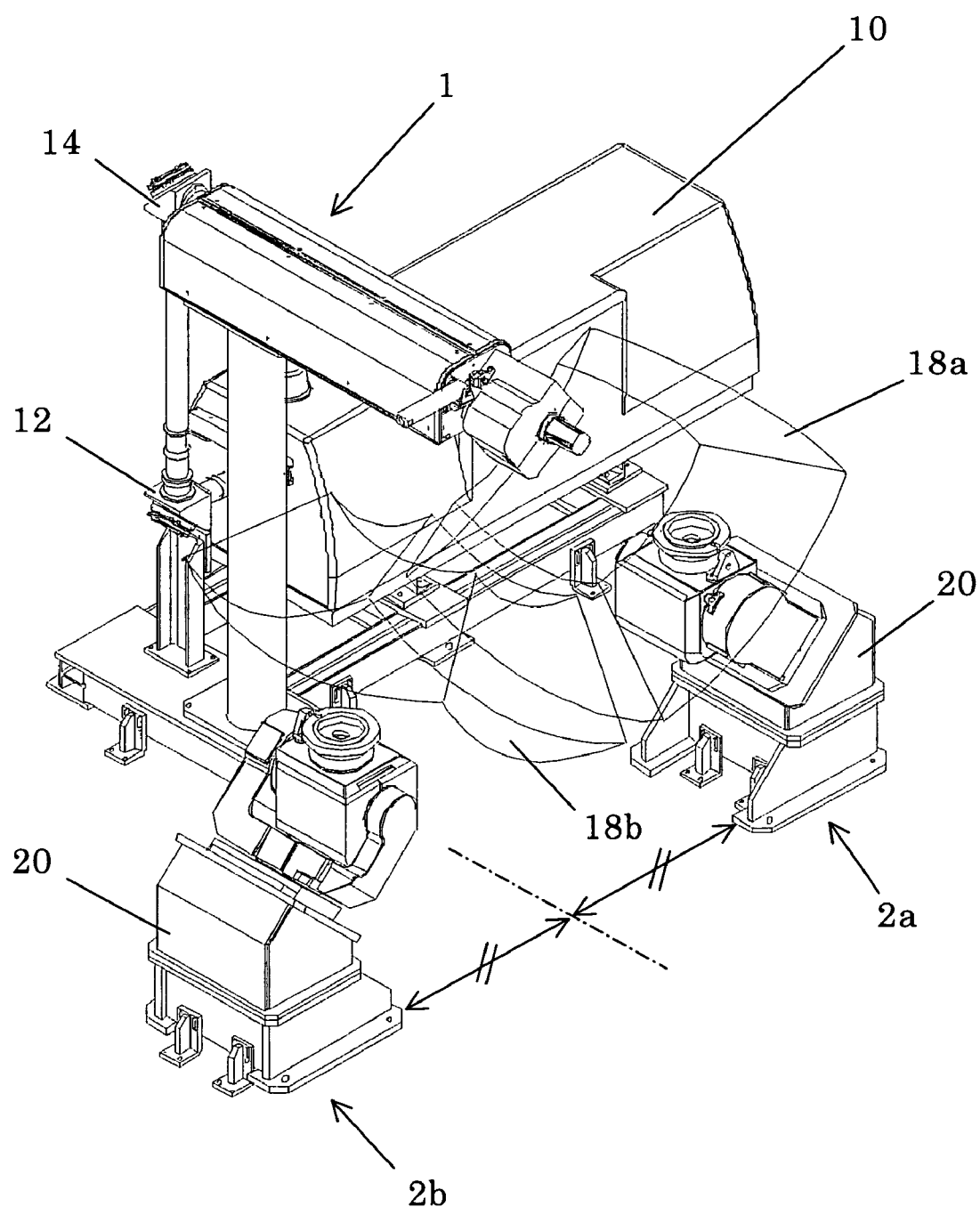
FIG. 1 shows a perspective view of the laser beam machine according to an embodiment of the invention.

An embodiment of the invention will be hereafter described with reference to the drawings. With reference to FIGS. 1 to 7, in a laser beam machine according to the present embodiment, a processing scanner 1 comprised of an optical system employing a laser oscillator 10 emits a laser beam with which an article to be processed (not shown) mounted on article position controllers 2a and 2b is processed. As shown in FIG. 1, in the laser beam machine, the article position controllers 2a and 2b, by which the position of the mounted article to be processed is controlled in accordance with the direction of the laser beam from the processing scanner 1, consist of triaxial positioners 20, each including three rotation axes. By these controllers, the position of the article to be processed is controlled such that its surface to be processed is disposed nearly perpendicularly with respect to the laser beam.

Figure 2:
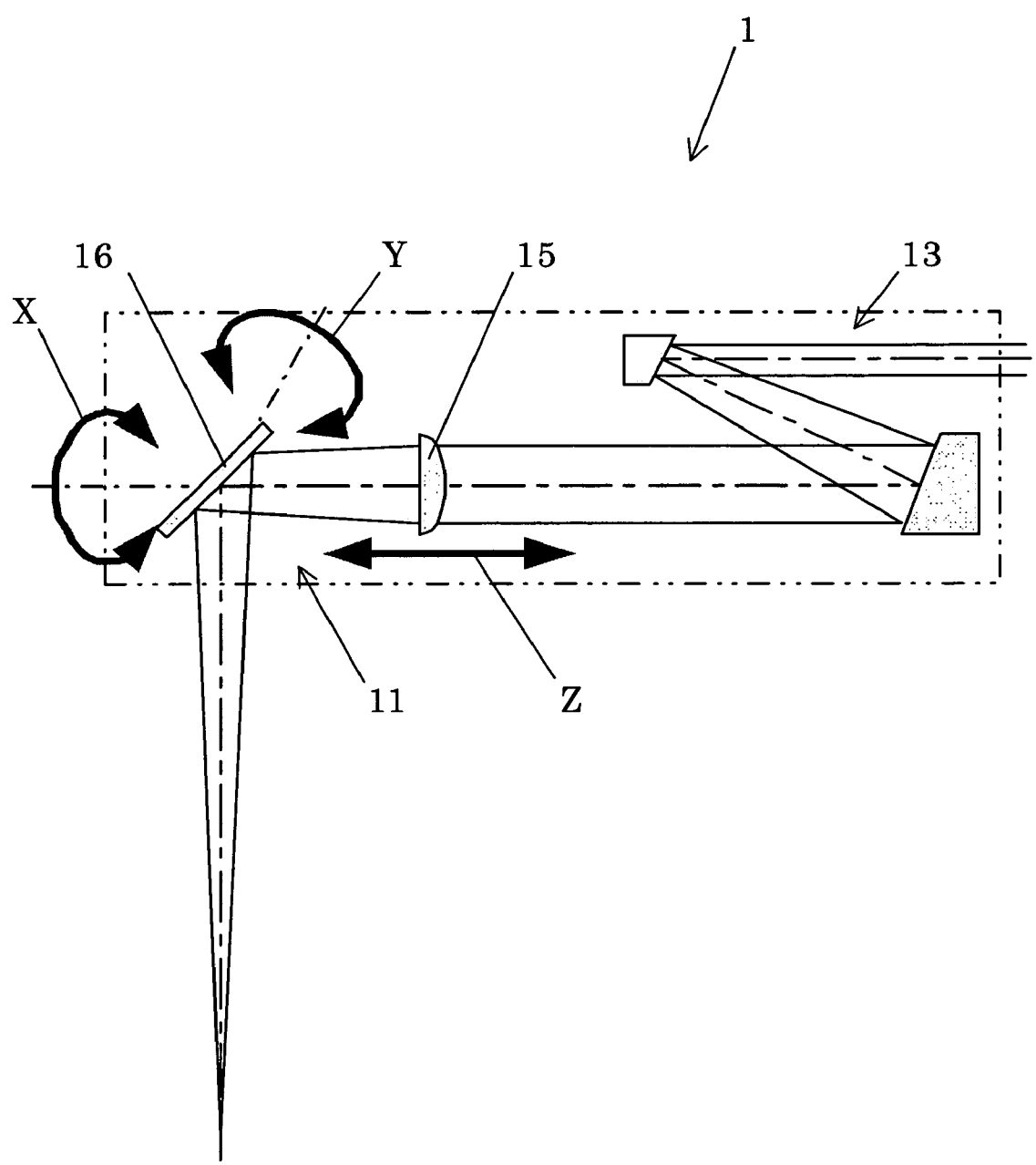
FIG. 2 schematically shows an optical system in a processing scanner in the laser beam machine according to the present embodiment.
Figure 3:
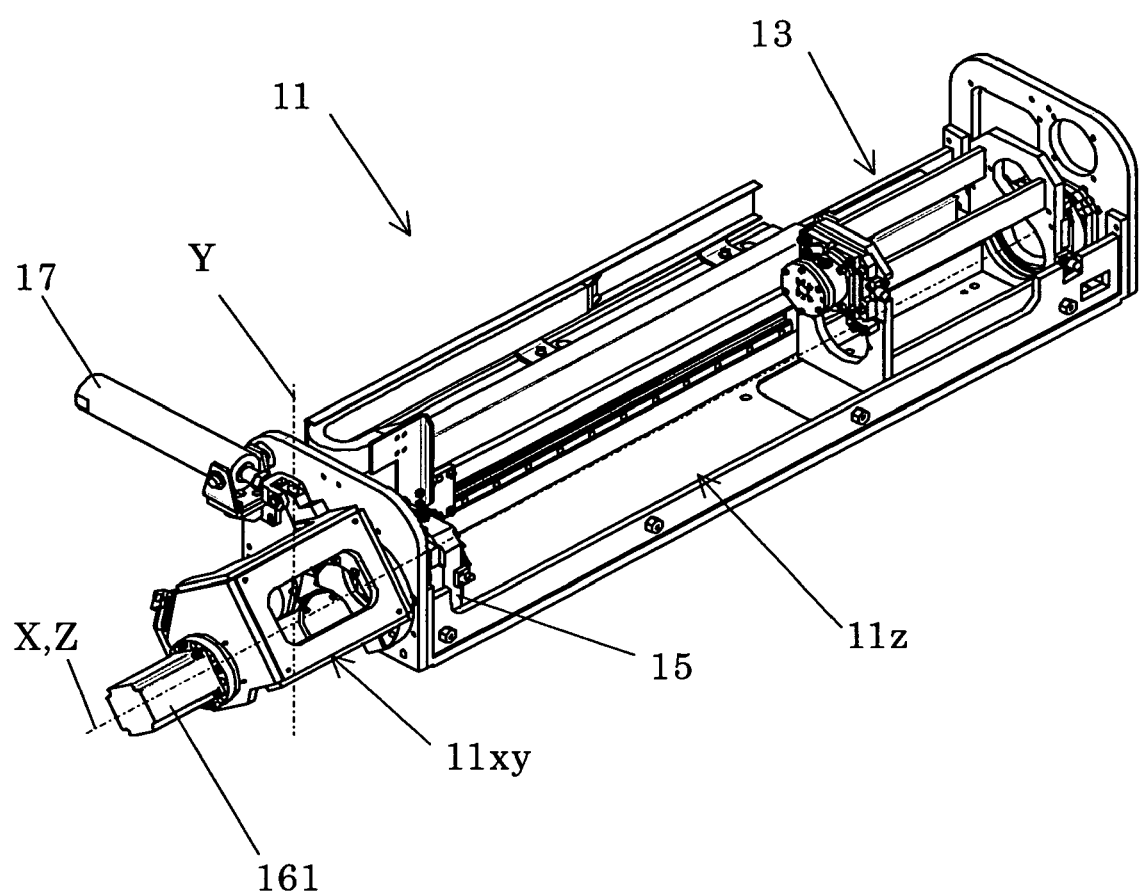
FIG. 3 shows a perspective view of the processing scanner of the laser beam machine according to the present embodiment, in which a cover of the processing scanner is removed.
Figure 4:
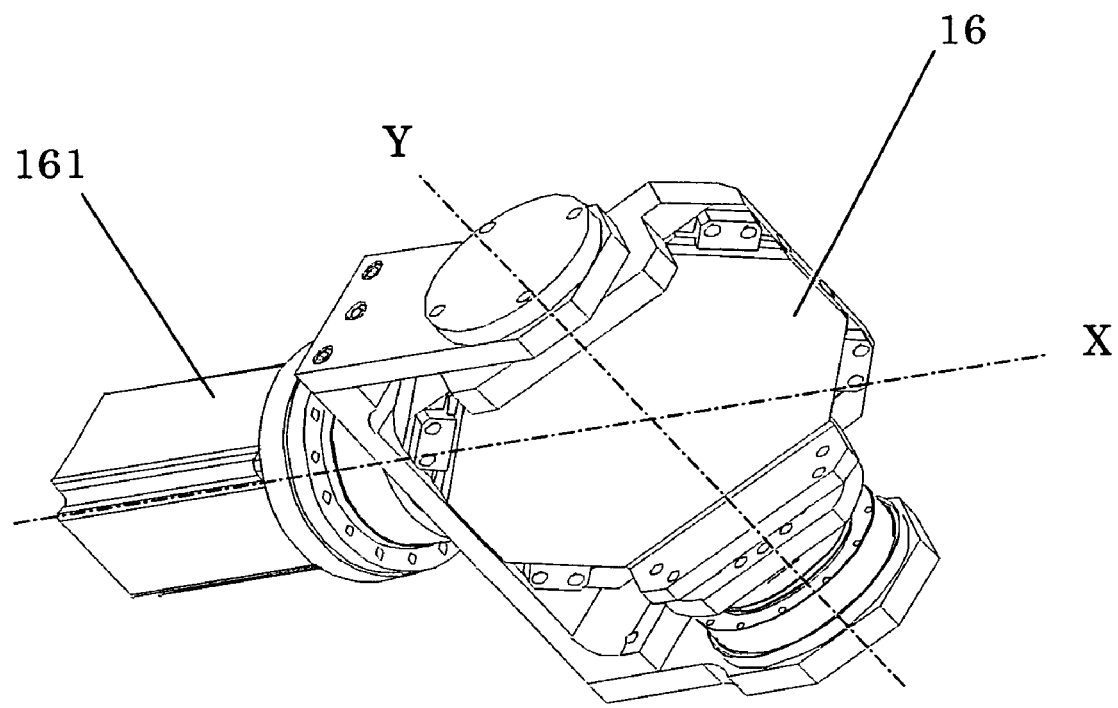
FIG. 4 shows a perspective view of the underside of an X-Y scan unit of the processing scanner according to the present embodiment.
Figure 5:
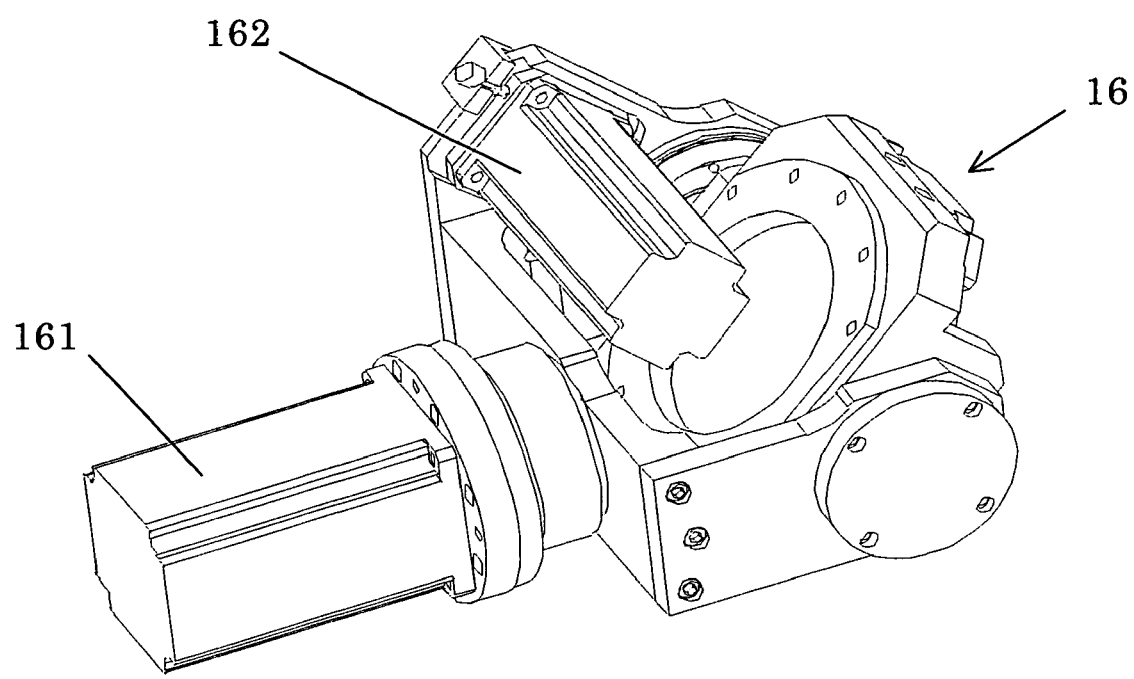
FIG. 5 shows a perspective view of the X-Y scan unit in the present embodiment from a different angle.

As shown in a schematic view in FIG. 2 and in a perspective view in FIG. 3, in which a cover is shown detached, the optical system of the processing scanner 1 is comprised of a beam-scanning mechanism 11 including a focusing lens 15 and a scanning mirror 16 that are movable. The beam scanning mechanism 11 is capable of controlling the focal position of the laser beam emitted by a $CO^2$ laser oscillator 10, which is mounted on a mount, in the X, Y, and Z directions.

The laser beam emitted by the laser oscillator 10 in the horizontal direction is bent vertically upward by a fold mirror 12 (see FIG. 1). The vertically upwardly directed laser beam is bent by a fold mirror 14 (see FIG. 1) in the horizontal direction and is then incident on the processing scanner 1. The processing scanner 1 is comprised of a beam expander 13 for expanding (magnifying) the laser beam, a beam-scanning mechanism 11 (consisting of a Z-scan unit 11z and an X-Y scan unit 11xy) for moving the beam that has been expanded in a scanning motion, and a tilt mechanism 17 for causing an article to be processed mounted on the article position controllers 2a and 2b to be irradiated with the laser beam. The tilt mechanism 17, shown in FIG. 3, causes the X-Y scan unit 11xy to be moved about the X-axis by the reciprocating movement of a hydraulic piston for rotational indexing purposes.

Once the tilt mechanism is indexed toward an article to be processed on one side, the laser beam incident on the processing scanner 1 is expanded by the beam expander 13 before it enters into the beam-scanning mechanism 11. The laser beam is then collected by the focusing lens 15 within the Z-scan unit 11z. The direction of the beam is further changed by the scanning mirror 16 within the X-Y scan unit 11xy and is then incident on the article to be processed. The scanning mirror 16 within the X-Y scan unit 11xy is shown magnified in FIGS. 4 and 5. The scanning mirror 16 is arranged such that its X-axis, which is one pivot axis thereof, coincides with the Z-axis, which is the direction along which the focusing lens 15 is moved, while its Y-axis, which is the other pivot axis thereof, is disposed perpendicular to the X-axis.

With reference to FIGS. 2 to 5, the movement (linear movement) of the focusing lens 15 along the Z-axis driven by a servo motor (not shown), and the pivoting motion of the scanning mirror 16 about the X- and Y-axes driven by servo motors 161 and 162, together enable the processing point upon which the laser-beam is focused to be moved to any desired position within predetermined operation ranges 18a and 18b, as shown in FIG. 1.

Figure 6:
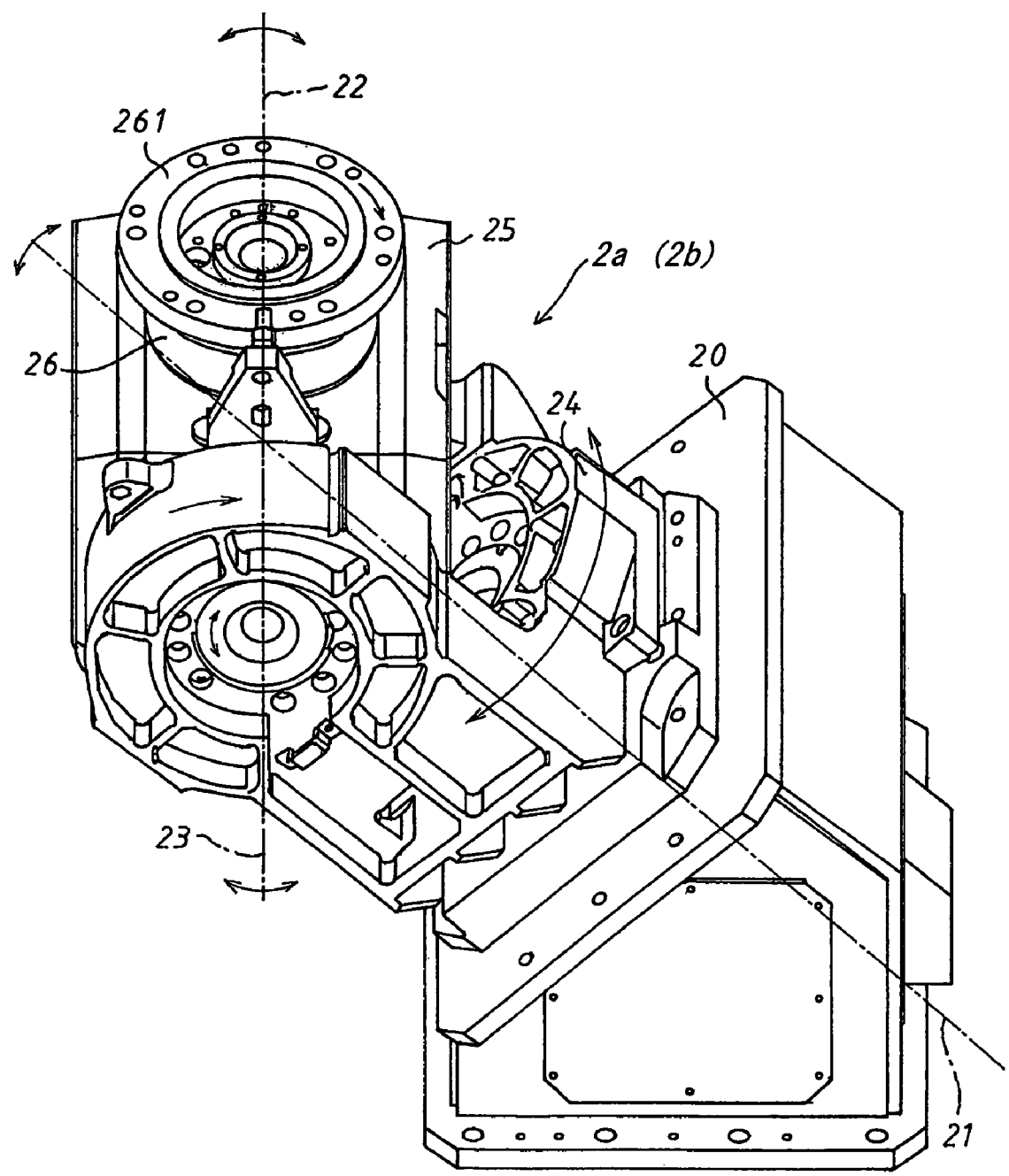
FIG. 6 shows a perspective view of a triaxial positioner in the present embodiment.

The pair of article position controllers 2a and 2b, on which articles to be processed are disposed, each consist of a triaxial positioner 20. As shown in FIGS. 1 and 6, each triaxial positioner 20 has a first rotational axis 21 that is disposed at an angle with respect to the horizontal plane. A first turning member 24 is provided that is turned about the first rotational axis 21. Within the first turning member 24, a third rotational axis 23 is disposed perpendicular to the first rotational axis 21, and a second turning member 25 is provided that turns about the third rotational axis 23. Within the second turning member 25, a second rotational axis 22 is disposed perpendicular to the third rotational axis 23. On the third turning member 26 that turns about the second rotational axis 22, a mount 261 on which an article to be processed (not shown) is mounted is disposed.

Further, the triaxial positioners 20 are constructed such that the rotational centers of their three axes, namely, the first rotational axis 21, the second rotational axis 22, and the third rotational axis 23, are concentrated at a single point, as shown in FIG. 6.

In accordance with the thus constructed laser beam machine, the laser beam emitted from the laser oscillator 10 travels via two pairs of fold mirrors 12 and 14 and are guided to the focusing lens portion 15 that is capable of linear movement for controlling the position of the processing spot (focal point) vertically (along the Z-axis) in the processing scanner 1, as shown in FIG. 1.

The laser beam passes through the focusing lens portion 15 by which it is focused at the processing spot via the scanning mirror 16, which is disposed at a predetermined position and can be pivoted. By controlling the angle of the pivotable scanning mirror 16, the position of the processing spot that is the focal point below is controlled in the planar direction (X-Y direction). Based on the combination of the three axes, the ranges of transfer of the processing spot or the focal point indicated by numerals 18a and 18b in FIG. 1 are determined.

The position of the article to be processed (not shown) disposed below on the mount 261 of the positioners 20 having the three axes can be controlled in any desired manner by the extent of movement of the individual axes 21, 22, and 23 of the positioners 20. Thus, the position of the processing spot of the article to be processed can be controlled to be nearly perpendicular to the optical axis within the ranges 18a and 18b of the laser focal point.

The triaxial arrangement is adopted so as to reduce the time for position-determining operations on the part of the positioners, so that maximum advantage can be taken of the features for high-speed movement of the focal point on the part of the scanners when implementing spot processing over a wide area. Based on a combination of the three rotational axes 21, 22, and 23, it becomes possible to control the positioning of the processing spot to be nearly perpendicular with respect to the laser beam radially emitted from the scanner 1.

As shown in FIG. 1, the triaxial positioners 20 that constitute the pair of article position controllers 2a and 2b are disposed symmetrically with respect to the center of the transfer ranges 18a and 18b of the focal point or the processing spot, with their inclined first rotational axes 21 opposed to each other. The center of the transfer ranges 18a and 18b of the processing spot is the plane that passes through the center of the angular range in which the X-Y scan unit 11$xy$ moves in a pivoting motion (namely, the center of the indexing angle) as the X-Y scan unit 11 is rotated by the tilt mechanism 17 for indexing. This plane is a vertical plane that includes the X- and Z-axes and the chain-dot line shown in FIG. 1.

Figure 7:
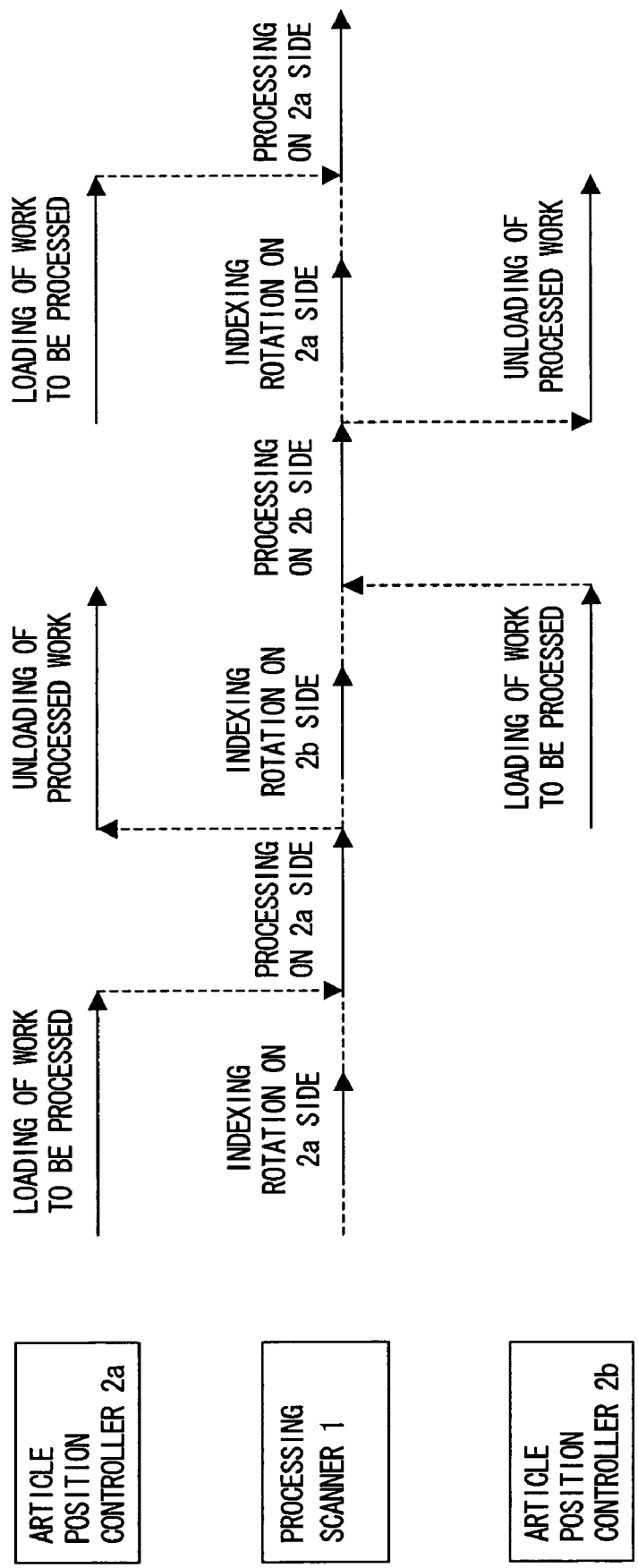
FIG. 7 shows a cycle chart illustrating the operation of the laser beam machine according to the present embodiment.

The operation of the thus constructed laser beam machine is described with reference to FIG. 7, which shows a cycle diagram. First, an article to be processed is loaded into the article position controller 2a. During the loading of the article to be processed, the X-Y scan unit 11$xy$ of the processing scanner 1 is rotated by the tilting mechanism 17 toward the article position controller 2a for indexing. Then, by controlling the beam-scanning mechanism 11 (Z-scan unit 11$z$ and X-Y scan unit 11$xy$) and the article position controller 2a (triaxial positioner 20) in a coordinated manner, the article to be processed mounted on the article position controller 2a is processed. When the processing is completed, the processed article mounted on the article position controller 2a is unloaded and, at the same time, another article to be processed is loaded onto the article position controller 2b. During these loading and unloading, the X-Y scan unit 11$xy$ is rotated by the tilt mechanism 17 toward the article position controller 2b for indexing. Then, by controlling the beam-scanning mechanism 11 and the article position controller 2b in a coordinated manner, the article to be processed mounted on the article position controller 2b is processed. After the processing is completed, the processed article mounted on the article position controller 2b is unloaded, and simultaneously another article to be processed is loaded into the article position controller 2a, followed by the turning of the X-Y scan unit 11$xy$ toward the article position controller 2a for indexing. Subsequently, the same processing cycle is repeated.

Thus, in accordance with the laser beam machine of the present embodiment that is operated as described above, the position of the article to be processed mounted on the article position controller 2 is controlled in a coordinated manner depending on the direction in which the laser beam is emitted from the processing scanner 1. Thus, limitations regarding the possible range of processing can be eliminated, articles of both intermediate and large sizes can be processed with the single scanner 1, and the need for changing the direction of optical irradiation or the position of the article to be processed is eliminated. Therefore, the need for installing a plurality of scanners or dividing the operation by introducing a plurality of laser beam machines is eliminated, whereby the problem of increase in the size and cost of equipment can be overcome.

Further, in accordance with the laser beam machine of the present embodiment, two article position controllers 2a and 2b are provided for the single processing scanner 1. Thus, while one article to be processed mounted on one article position controller 2a is processed and then unloaded, another article to be processed can be loaded into the other article position controller 2b, whereby the wait time for the laser beam machine can be reduced and production efficiency can be improved.

Furthermore, in accordance with the laser beam machine of the present embodiment, the beam-scanning mechanism 11 (X-Y scan unit 11$xy$) of the processing scanner 1 is rotated by the tilt mechanism 17 for indexing. Therefore, by rotating the X-Y scan unit 11$xy$ to individual positions for indexing, the articles to be processed mounted on the pair of article position controllers 2a and 2b can be individually processed.

Moreover, in accordance with the laser beam machine of the present embodiment, the position of the article to be processed is relatively controlled by the triaxial positioners 20 that constitute the article position controllers 2a and 2b, each of which includes three rotational axes, such that the surface to be processed is nearly perpendicular to the laser beam from the processing scanner 1. As a result, the surface to be processed of the article to be processed can be optimally processed.

In accordance with the present embodiment, the processing scanner 1 and the positioners 20 for controlling the position of the article to be processed can be controlled in a coordinated manner, and they are disposed as shown in the combination diagram. Thus, a laser beam machine is realized whereby an article to be processed of intermediate and large sizes (corresponding to a possible range of processing of 1200×1200×400, for example) can be three-dimensionally processed with the same scanner at ideal angles of laser beam irradiation.

In accordance with the laser beam machine of the present embodiment, it is possible to increase the angle of pivoting of the optical axis of the processing scanner 1 as compared with conventional examples, whereby a great increase in the possible range of processing can be achieved while ensuring process quality. In addition, either a continuous seamless processing or a spot processing (at a single spot or in a stitch) may be selected as a processing method, enabling the consolidation of processing steps.

In accordance with the present embodiment, the position of the article to be processed can be controlled as desired by the positioners 20 in combination with the processing scanner 1. Thus, the angle of pivoting of the laser beam can be increased as compared with the aforementioned conventional example and, consequently, the ranges 18a and 18b of the processing spot increase and so the size of the article to be processed can be increased.

Furthermore, while conventionally article(s) to be processed have been mainly those having planar surfaces due to limitations of the angle of laser beam irradiation, articles to be processed having three-dimensional shapes can be processed in accordance with the present embodiment.

The laser beam machine according to the present embodiment is characterized by the processing scanner 1 capable of moving the focal point over a wide area at high speed, and the positioners 20 disposed under the processing scanner 1 that are capable of controlling the position of the surface to be processed including the processing spot of the article to be processed as desired. By controlling the processing scanner 1 and the positioners 20 simultaneously in a coordinated manner, laser processing can be performed effectively, and the surface to be processed including the processing spot of the article to be processed can be determined at high speed to have an optimal position for laser processing.

As a result, high-speed laser processing can be performed over areas and with levels of quality that have not been achievable with conventional single scanners. The article to be processed can be three-dimensionally processed by the free position control of the article, so that the processing steps can be consolidated. Further, the non-processing time (empty-feed time) can be drastically reduced by high-speed transfer between processing spots, enabling highly efficient processing.

In accordance with the laser beam machine of the present embodiment, because the triaxial positioners 20 are disposed such that the centers of rotation of the three axes 21, 22, and 23 are concentrated at a single point, as shown in FIG. 6, coordinates conversion for the calculation of the position of the article to be processed during coordinated control can be simplified, thereby facilitating and ensuring coordinated control.

Furthermore, in accordance with the laser beam machine of the present embodiment, because the first axes 21 of the triaxial positioners 20 are disposed with an incline, the installment, adjustment, detachment and other work on the article to be processed are facilitated. Also, because the first axes 21 of the inclined pair of triaxial positioners 20 are disposed opposite to each other, the laser beam from the X-Y scan unit 11xy of the processing scanner 1, which is rotated for indexing, can be more easily made nearly perpendicular.

In accordance with the laser beam machine of the present embodiment, the focal point of the laser beam is controlled in the X, Y, and Z directions by the beam-scanning mechanism 11 of the processing scanner 1 via the focusing lens portion 15 and the scanning mirror 16, which are movable. Thus, the laser beam can be controlled to be nearly perpendicular to the surface to be processed of the article to be processed, whereby the surface of the article can be optimally processed and the ranges 18a and 18b of the processing spot can be extended.

The laser beam machine in accordance with the present embodiment comprises the processing scanner 1 that is equipped with the triaxial positioners 20 for position changing purposes. Thus, the position of the article to be processed can be controlled as desired, and thus processing can be achieved effectively and over a wide area while the angle of laser beam irradiation is maintained to be in a nearly perpendicular state at all times. The triaxial positioners 20 for controlling the position of the article to be processed can be controlled in coordination with the processing scanner 1 or independently. This free position control feature of the triaxial positioners 20, together with the wide-range and high-speed welding based on the high-speed transfer between processing spots, which is a feature of the processing scanner 1, enables a continuous three-dimensional processing of the article to be processed. In addition, because of the two triaxial positioners 20 provided as the article position controllers 2a and 2b, the time required for the loading and unloading of the article to be processed can be reduced, thereby enhancing the production efficiency of the laser beam machine.

The laser beam machine according to the present embodiment includes the triaxial scanner 1 including a long-focus optical system employing a $CO_2$ laser oscillator, and the triaxial (or biaxial, depending on the object to be processed) positioners 20 for the free position control of the article to be processed. The laser beam machine can be controlled in a coordinated manner.

The laser beam machine according to the present embodiment provides a system in which the beam-scanning mechanism 11 capable of controlling the focal position of the laser beam in the X, Y, and Z directions via movable focusing lens and mirror, and the pivoting positioners 20 capable of inclining an article to be welded with respect to the laser beam are combined. By moving the article to be welded in a pivoting motion, three-dimensional welding areas 18a and 18b that are larger than the welding area obtained by the beam-scanning mechanism 11 can be obtained. In addition, because the pair of inclined triaxial positioners 20 are disposed in an opposed manner, the laser beam from the X-Y scan unit 11xy of the beam-scanning mechanism 11, which is rotated for indexing, can be made more nearly perpendicular to the article to be processed.

By moving the article to be welded in a pivoting motion so as to cause the surface to be welded to be oriented perpendicular to the laser beam, welding processing can be performed with enhanced energy efficiency. Thus, even when welding cannot be performed due to the interference of the laser beam caused by the shape of the article to be welded, the laser beam machine of the invention enables welding without interference by inclining the article to be welded.

The above-described embodiment is provided for illustrative purposes only, and the invention is not limited thereby. Modifications and additions can be made, unless such modifications or additions go against the technical concept of the invention that can be recognized by those skilled in the art from the description and the drawings.

While the above embodiment employed the triaxial positioners 20, this is merely for illustrative purposes only, and the invention by no means is limited by such embodiment. Regarding the structure of the positioners, laser beams do not have any rotational directionality about the optical axis. Therefore, an embodiment can be adopted whereby biaxial positioners are employed because processing requirements are in some cases satisfied by a biaxial structure.

While in the above embodiment lenses were employed in the beam-scanning mechanism 11, this is merely for illustrative purpose only, and the invention is not limited thereby. For example, an embodiment may be adopted in which a concave mirror is used for focusing purposes, instead of lenses. Further, while in the above embodiment the beam-scanning mechanism 11 was described as being rotated for indexing purposes, such indexing may be performed by other methods.

INDUSTRIAL APPLICABILITY

In accordance with the invention, limitations regarding the possible range of processing can be processed in a laser beam machine can be overcome, and articles to be processed of intermediate to large sizes can be processed with the single scanner. Furthermore, the wait time for the laser beam machine can be reduced, thereby achieving higher production efficiency.

The invention claimed is:

1. A laser beam machine for processing an article to be processed with a laser beam comprising:
    (a) a processing scanner, which comprises:
        a beam-scanning mechanism, said beam-scanning mechanism including a Z-scan unit and an X-Y scan unit, said Z-can unit including a focusing lens which focuses a laser beam and is movable in a direction parallel with a Z axis, and said X-Y scan unit including a pivotable scanning mirror for performing scanning with said scanning mirror pivotally rotating about an X axis parallel with said Z axis and about an Y axis perpendicular to said X axis; and
        a tilt mechanism for pivotally rotating said X-Y scan unit about said X axis; and (b) two article position controllers for controlling in a coordinated manner the position of a mounted article to be processed in accordance with the direction of the laser beam from said processing scanner, said article position controllers being disposed in the irradiation path of the laser beam from said X-Y scan unit which is positioned at a pivot end of said tilt mechanism, and wherein a focal point of said laser beam is a processing spot, a transfer range of said focal point being changed by said tilt mechanism, and said article position controllers being disposed substantially symmetrically with respect to the center of the transfer range of said focal point.

2. The laser beam machine according to claim 1, wherein said two article position controllers are each comprised of a triaxial positioner having three rotational axes, wherein the first axes of said article position controllers are inclined and disposed opposite to each other, and wherein the position of a surface to be processed of said article to be processed is controlled to be nearly perpendicular to said laser beam.

3. The laser beam machine according to claim 2, wherein said triaxial positioners are constructed such that the centers of rotation of said three axes are concentrated at a single point.

* * * * *